Patented Nov. 19, 1946

2,411,141

UNITED STATES PATENT OFFICE 2,411,141

POLYAMINE RESINS AND THE METHOD OF PREPARING THE SAME

Chester E. Adams, Highland, Ind., assignor to Standard Oil Company, Chicago, Ill., a corporation of Indiana No Drawing. Application April 30, 1943, Serial No. 485,157

16 Claims. (Cl. 260—2)

This invention relates to synthetic resins and more particularly synthetic amine resins and to the preparation thereof.

An object of the present invention is to provide an improved synthetic resin of the type containing amine groups. Another object of the invention is to provide an improved method of preparing synthetic amine resins. These as well as other objects and advantages can be attained by preparing resins by reacting certain types of haloalkyl aromatic compounds with aqueous ammonia.

The aromatic component of the reaction is a mono-nucleated or poly-nucleated aromatic compound having at least two active haloalkyl groups preferably chloroalkyl and bromoalkyl groups, substituted in the aromatic nucleus. The haloalkyl substituents are preferably halomethyl groups and more preferably are halomethyl groups in non-adjacent positions in the ring. In addition to the haloalkyl substituents the nucleus may contain other hydrocarbon substituent groups such as alkyl, cyclo alkyl and other aryl groups.

By the term "active haloalkyl groups" as employed in the above definition is meant such haloalkyl groups which are capable of precipitating a silver halide from a silver nitrate solution in the cold; for example, an active chloroalkyl group is one which is capable of precipitating silver chloride from a silver nitrate solution in the cold.

Representative of the class of aromatic compounds which is employed in the preparation of resins of the present invention are the following:

Di(chloromethyl) naphthalenes
Di(chloromethyl) benzenes
Di(bromomethyl) naphthalenes
Di(bromomethyl) benzenes
Di(chloromethyl) toluenes
Di(bromomethyl) toluenes
Di(chloromethyl) mesitylene
a,a'-Dichlorodurenes
a,a'-Dichloroisodurenes
a,a'-Dichloroprehnitenes
Di(chloromethyl) methyl naphthalene
Di(chloromethyl) diethylbenzene
Di(bromomethyl) methyl naphthalene
Tri(chloromethyl) naphthalene
Di(chloroethyl) naphthalene and others.

In accordance with the present invention the polyamine synthetic resins are obtained by reacting suitable poly(haloalkyl) aromatic compounds of the above type with aqueous ammonia at room temperature or higher but below about 480° F. and preferably at a temperature within the range of about 140 to about 350° F. and under a pressure sufficient to maintain the reactants in a liquid phase. The reaction time obviously varies with the reaction temperature and may be a matter of minutes to a matter of days. When the reaction is conducted within the preferred range; namely, from about 140° F. to about 350° F., the reaction time varies from about one-half hour to about thirty hours.

The concentration of the aqueous ammonia solution can be varied depending upon the poly (haloalkyl) aromatic compounds used and upon the reaction conditions. However, in any case the aqueous ammonia solution should be sufficiently concentrated to avoid hydrolysis of the di(haloalkyl) aromatic compound. Since sufficient basic material functioning as an acid acceptor should be used in carrying out the reaction, the ammonia may constitute the sole basic material employed acting both as a reactant and an acid acceptor or other basic compounds may be employed in conjunction therewith. In the absence of another basic material as an acid acceptor, the amount of ammonia used should be in excess of 8 mols of ammonia for each 6 mols of halogen in the aromatic compound employed. When other basic materials are employed as the acid acceptor, the amount of aqueous ammonia employed is correspondingly reduced. Thus, when none of the aqueous ammonia is utilized as the acid acceptor, 2 mols of ammonia is used for each 6 atoms of halogen in the aromatic compound.

While it is preferable to employ aqueous ammonia for the synthesis of the polyamine resins of the present invention, aqueous solutions of water soluble primary amines, preferably alkyl mono- or polyamines can be used, either alone or in combination with aqueous ammonia.

In conducting the reaction suitable inert or non-reactive diluents can be employed such as, for example, ether, hexane, dioxane, benzene, toluene and the like.

The following examples are illustrative of the methods of obtaining infusible but moldable polyamine resins of the hereindescribed types.

*Example I*

Twenty grams of 2,4-dichlorodurene were reacted at 170° F. with 200 cc. of a concentrated aqueous ammonia solution. Although the reaction mass solidified in one-half hour, the reaction was continued for two hours. After boiling with acetone and water a product yield of 2.5 grams was obtained. The washed material was treated with a hot 5% solution of sodium hydroxide for two hours and an infusible, but moldable resinous material obtained.

Example II

Twenty grams of 2,4-dichlorodurene were reacted with 200 cc. of a concentrated aqueous ammonia solution for four hours at 120° F. An additional 100 cc. of aqueous NH₃ were added and the reaction continued for four more hours. The reaction mass was filtered and extracted twice with boiling acetone. A yield of 6.5 grams of a moldable resinous material was obtained.

Example III

One hundred and forty grams of 2,4-dichlorodurene were reacted with 1000 cc. of a 15% aqueous solution of ammonia at 140° F. for eighteen hours. The solid reaction material was removed to a filter and washed with cold water and dried with alcohol and ether. The washed material was then extracted two times with hot benzene, filtered and dried. A yield of 70 grams of a moldable resinous material was obtained.

Example IV

Twenty grams of 2,4-dichlorodurene and 70 cc. of concentrated ammonia were allowed to react at room temperature for three weeks. The product was filtered, washed with water, and extracted twice with boiling hexane to obtain a product yield of 8.4 grams. The material was then refluxed with 5% sodium hydroxide solution for four hours and filtered. A moldable resin was obtained.

Example V

Five grams of di(chloromethyl)naphthalene were reacted with 200 cc. of a 28% aqueous solution of NH₃ in a shaker bomb at 250° F. to 260° F. for about twenty-one hours. At the end of this time the temperature increased to 335° F., heating was stopped and the reaction products shaken for another hour, making a total reaction time of twenty-two hours.

The bomb was opened and the contents thereof filtered. The solid material was washed with water and dried at 220° F., and a yield of 3.4 grams of solid material obtained. The resinous material was molded with a platen temperature of 450° F. and 8000 pounds per square inch. A molding with a very hard surface was obtained.

Example VI

One gram of 1,5-dichloromethyl naphthylene and 5 cc. of a 28% aqueous ammonia solution were heated in an oven in a sealed tube at 172° F. for forty hours. The contents of the tube were then removed to a flask and refluxed with 200 cc. of water for two hours. The material was then filtered and dried and a solid material weighing .85 gram was obtained. The material was insoluble in boiling hexane and boiling methyl naphthalene. The resinous material was molded at a platen temperature of 425° F. and 8000 pounds per square inch. The molding obtained was hard with a high polish.

Example VII

Twenty grams of 2,4-dichlorodurene and 80 cc. of 28% aqueous ammonia were heated in a sealed tube at 135° F. for sixteen hours and the temperature raised to 165 to 170° F. and heating continued for four more hours. The reaction product was ground up, refluxed in water, filtered and dried. A yield of 13.7 grams of an infusible resinous material was obtained.

Example VIII

Ten grams of 2,4-dichlorodurene and 60 cc. of 28% aqueous ammonia were heated in a sealed glass tube for sixteen hours and at 115° F. The reaction product was broken up and added to 300 cc. of acetone and the mixture filtered. The solid material was finely divided and puddled with 150 cc. of acetone, filtered again and dried at room temperature. The powder was reground, puddled again with acetone and filtered. After the finely divided solid material had dried it was shaken vigorously with 400 cc. of water for ten to fifteen minutes and filtered. The solid material was mixed with 500 cc. water and the mixture added to 200 cc. of 2% sodium hydroxide. The mixture was refluxed for one hour, 200 cc. of water added, and the slurry filtered. The cake was washed with 500 cc. more of water and the product dried at 110° F. A yield of 4.37 grams of a moldable resinous product was obtained.

The polyamine synthetic resins of the present invention are useful for many purposes such as, for example, in the molding and preparation of electrically insulated articles, as acid and alkali resistant containers and in particular are useful wherever high melting alkali, and acid resistant as well as electrically insulated plastics and resinous materials are required.

Since many embodiments of this invention may be made without departing from the spirit and scope thereof, it is to be understood that the invention is not limited to the specific embodiments thereof described herein, except as defined in the appended claims.

I claim:

1. The method of preparing a polyamine resin comprising reacting in the liquid phase an aromatic hydrocarbon having at least two active haloalkyl groups, capable of precipitating a silver halide from a silver nitrate solution in the cold, substituted in the aromatic nucleus, with aqueous ammonia sufficiently concentrated to avoid hydrolysis of said aromatic hydrocarbon, at least two mols of ammonia being used for each six atoms of halogen in the aromatic hydrocarbon.

2. The method of preparing a polyamine resin comprising reacting a poly(haloalkyl) aromatic hydrocarbon having at least two active haloalkyl groups, capable of precipitating a silver halide from a silver nitrate solution in the cold, substituted in the aromatic nucleus, with aqueous ammonia at a temperature ranging upward from room temperature to below about 480° F. and at a pressure sufficient to maintain the reaction mixture in the liquid phase at the reaction temperature, said aqueous ammonia being sufficiently concentrated to avoid hydrolysis of said aromatic hydrocarbon, at least two mols of ammonia being used for each six atoms of halogen in the aromatic hydrocarbon.

3. The method of preparing a synthetic resin as described in claim 2 in which the poly(haloalkyl) aromatic hydrocarbon is a poly(chloroalkyl) aromatic hydrocarbon containing at least two active chloroalkyl groups capable to precipitating a silver halide from a silver nitrate solution in the cold.

4. The method of preparing a synthetic resin as described in claim 2 in which the poly(haloalkyl) aromatic hydrocarbon is a poly(halomethyl) aromatic hydrocarbon containing at least two active halomethyl groups capable of precipitating a silver halide from a silver nitrate solution in the cold.

5. The method of preparing a synthetic resin as described in claim 2 in which the poly(haloalkyl) aromatic hydrocarbon is a di(halomethyl) naphthalene.

6. The method of preparing a synthetic resin as described in claim 2 in which the poly(haloalkyl) aromatic hydrocarbon is a di(chloromethyl) naphthalene.

7. The method of preparing a synthetic resin as described in claim 2, in which the poly(haloalkyl) aromatic hydrocarbon is a di(chloromethyl) methyl naphthalene.

8. The method of preparing a synthetic resin as described in claim 2 in which the poly(haloalkyl) aromatic hydrocarbon is a poly(halomethyl) mono-nucleated aromatic hydrocarbon containing at least two active halomethyl groups capable of precipitating a silver halide from a silver nitrate solution in the cold.

9. The method of preparing a synthetic resin as described in claim 2 in which the poly(haloalkyl) aromatic hydrocarbon is a di(chloromethyl) xylene.

10. The method of preparing a polyamine resin comprising reacting a poly(haloalkyl) aromatic hydrocarbon having at least two active haloalkyl groups, capable of precipitating a silver halide from a silver nitrate solution in the cold, substituted in the aromatic nucleus, with aqueous ammonia at a temperature ranging upward from room temperature to below about 480° F. and at a pressure sufficient to maintain the reaction mixture in the liquid phase at the reaction temperature, said aqueous ammonia being sufficiently concentrated to avoid hydrolysis of the aromatic hydrocarbon and at least eight mols of ammonia being used for each six atoms of halogen in the aromatic hydrocarbon.

11. The method of preparing a polyamine resin comprising reacting a poly(haloalkyl) aromatic hydrocarbon having at least two active haloalkyl groups, capable of precipitating a silver halide from a silver nitrate solution in the cold, substituted in the aromatic nucleus, with aqueous ammonia at a temperature of about 140° F. to about 350° F. and under sufficient pressure to maintain the reactants in the liquid phase at a reaction temperature, said aqueous ammonia being sufficiently concentrated to avoid hydrolysis of the aromatic hydrocarbon and at least eight mols of ammonia being used for each six atoms of halogen in the aromatic hydrocarbon.

12. The method of preparing a polyamine resin comprising reacting a mixture of a poly(haloalkyl) aromatic hydrocarbon having at least two active haloalkyl groups, capable of precipitating a silver halide from a silver nitrate solution in the cold, substituted in the aromatic nucleus, with a concentrated aqueous ammonia solution sufficiently concentrated to avoid hydrolysis of the poly(haloalkyl) aromatic hydrocarbon in the presence of a basic acid acceptor at a temperature ranging upward from room temperature to below about 480° F. and at a pressure sufficient to maintain the reactants in the liquid phase at the reaction temperature, at least two mols of ammonia being used for each six atoms of halogen in the aromatic hydrocarbon, extracting the reaction mass with a hot inert solvent and drying the extracted reaction mass.

13. The method of preparing a polyamine resin as described in claim 12 in which the poly(haloalkyl) aromatic hydrocarbon is a poly(halomethyl) poly-nucleated aromatic hydrocarbon having at least two active halomethyl groups capable of precipitating a silver halide from a silver nitrate solution in the cold.

14. The method of preparing a polyamine resin as described in claim 12 in which the poly(haloalkyl) aromatic hydrocarbon is a di(chloromethyl) naphthalene.

15. The method of preparing a polyamine resin as described in claim 12 in which the poly(haloalkyl) aromatic hydrocarbon is a poly(halomethyl) mono-nucleated aromatic hydrocarbon having at least two active halomethyl groups capable of precipitating a silver halide from a silver nitrate solution in the cold.

16. The method of preparing a polyamine resin as described in claim 12 in which the poly(haloalkyl) aromatic hydrocarbon is a di(chloromethyl) xylene.

CHESTER E. ADAMS.